(12) United States Patent
Cruz

(10) Patent No.: US 8,426,790 B2
(45) Date of Patent: Apr. 23, 2013

(54) METHOD FOR CONCENTRATING AND TRANSMITTING ENERGY OVER AN OPTICAL CONDUIT

(76) Inventor: Aluizio M. Cruz, Paramount, CA (US)

( * ) Notice: Subject to any disclaimer, the term of this patent is extended or adjusted under 35 U.S.C. 154(b) by 1147 days.

(21) Appl. No.: 12/090,721

(22) PCT Filed: Oct. 19, 2006

(86) PCT No.: PCT/US2006/060083
§ 371 (c)(1),
(2), (4) Date: May 1, 2008

(87) PCT Pub. No.: WO2007/048114
PCT Pub. Date: Apr. 26, 2007

(65) Prior Publication Data
US 2008/0253010 A1 Oct. 16, 2008

Related U.S. Application Data

(60) Provisional application No. 60/728,245, filed on Oct. 19, 2005.

(51) Int. Cl.
*G01C 21/02* (2006.01)
(52) U.S. Cl.
USPC ...................................................... 250/203.4
(58) Field of Classification Search ............... 250/203.4; 136/246, 248
See application file for complete search history.

(56) References Cited

U.S. PATENT DOCUMENTS

| | | | |
|---|---|---|---|
| 2,199,045 A | 4/1940 | Dallenbach | |
| 4,201,197 A | 5/1980 | Dismer | |
| 4,277,129 A * | 7/1981 | Taucher | 359/365 |
| 4,312,330 A | 1/1982 | Holdridge | |
| 4,529,830 A * | 7/1985 | Daniel | 136/246 |
| 4,809,292 A | 2/1989 | Muller | |
| 5,089,055 A * | 2/1992 | Nakamura | 136/248 |
| 5,481,918 A | 1/1996 | Hasegawa et al. | |

(Continued)

OTHER PUBLICATIONS

Goodwin, Brian, "How the Leopard Changed Its Spots", London: Weidenfeld and Nicolson, 1994.

(Continued)

*Primary Examiner* — Thanh Luu
(74) *Attorney, Agent, or Firm* — Michael Best & Friedrich LLP

(57) ABSTRACT

A system for generating and transmitting energy and methods of manufacturing and using the same. The system for generating and transmitting energy includes prisms, lenses, mirrors, optical cables or optic conduits, heat filters, light filters, and electricity filters. The lenses comprise lens systems to capture electromagnetic signals (wave and particle) coming from any source of radiant energy, from one or more sources of light, from one or more reflective surfaces, or from any electromagnetic wave, long or short. Upon receiving the electromagnetic signals, the lens system multiple n times the intensity of the signals by a method of infinitesimal folding of signals, a method basically consisting of an over-concentration of signals folding onto themselves tenth to millionth times in order to produce substantially concentrated signals and to project the substantially concentrated signals into one single optical cable. These substantially concentrated signals are transmitted to long distances as they are reflected through the interior of these optical cables or any especial optic conduits (in a conceptual manner similar to signal reflection in fiber optics cables). At the distal ends of the optical cable three filters will extract heat, white light and electricity.

16 Claims, 1 Drawing Sheet

U.S. PATENT DOCUMENTS

| | | | |
|---|---|---|---|
| 5,560,700 | A | 10/1996 | Levens |
| 5,862,799 | A * | 1/1999 | Yogev et al. ............ 126/578 |
| 6,302,100 | B1 | 10/2001 | Vandenberg |
| 6,620,995 | B2 | 9/2003 | Vasylyev et al. |
| 6,707,837 | B1 | 3/2004 | Muller |
| 6,718,103 | B2 | 4/2004 | Cruz |
| 2005/0039791 | A1 | 2/2005 | Johnson |
| 2006/0174867 | A1 | 8/2006 | Schaafsma |
| 2007/0137640 | A1 | 6/2007 | Tarabishi |

OTHER PUBLICATIONS

Feynman, Richard, "The Strange Theory of Light and Matter", pp. 8-9, 88-91, & 94-97, Princeton: Princton University Press, 1988.

Prigogine, Ilya, "The End of Certainty", New York: The Free Press, 1997.

Prigogine, Ilya (with Isabelle Stengers), "Order Out of Chaos", New York: Bantam Books, 1988.

Ernst, U. et al., "Free Expansion of a Bose-Enstein Condensate from an Ioffe-Pritchard Magnetic Trap", Applied Physics B, Lasers and Optics, Springer-Verlag, 1998.

Munstermann, P., et al., "Dynamics of Single-Atom Motion Observed in a High-Finesse Cavity", The American Physical Society, vol. 82, No. 19, May 10, 1999.

Munstermann, P., et al., "Single Slow Atoms from an Atomic Fountain Observed in a High-Finesse Optical Cavity", Optics Communications 159, pp. 63-67, Elsevier Science B.V., 1999.

DeLanda, Manuel, "The Geology of Morals", Zero News Datapool, Available Online at: <http://www.t0.or.at/delanda/geology.htm>, Printed Mar. 31, 2009.

Tane, Jean-Louis, "Inert Matter and Living Matter: A Thermodynamic Interpretation of their Fundamental Difference", Journal of Theoretics, vol. 5-3, 2003.

Evans, Barrie, "Diffuse Light in Focus", The Architects' Journal—the home of British Architecture, Available Online at: <http://www.architectsjournal.co.uk/diffuse-light-in-focus/777287.article>, Mar. 5, 1998.

Researchers at the University of California, Berkeley, "Promising New Metamaterial Could Transform Ultrasound Imaging", Available Online at: <http://www.physorg.com/news68357796.html>, Jun. 1, 2006.

Janssen, Michel, et al., "The Optics and Electrodynamics of Moving Bodies", Max Planck Institute for the History of Science, 2004.

Remmert, Reinhold, "From Riemann Surfaces to Complex Spaces", Societe Mathematique De France, 1998.

Randall, Lisa, "Warped Passages", pp. 222-233, 2005.

Wieder, Sol, "An Introduction to Solar Energy for Scientists and Engineers", Chapter 1, pp. 1-15, 1982.

Deleuze, Gilles, "Le Pli: Leibniz et le Baroque" Translation: A Plea for Leibniz, University of Minnesota Press, 1988.

Cirak, F., et al., "Oscillatory Thermomechanical Instability of an Ultrathin Catalyst", Science, vol. 300, pp. 1932-1936, Jun. 20, 2003.

Bertram, M., et al., "Complex Patterns in a Periodically Forced Surface Reaction", Journal of Physical Chemistry, vol. 107, No. 35, pp. 9610-9615, American Chemical Society, 2003.

Davydov, A.S., "Solitons in Molecular Systems", Translation, Chapter 1, pp. 18-23, D. Reidel Publishing Company, Oct. 14, 1986.

Sexl, U., "Schrodinger's Contribution to Relativity", Acta Physica Austriaca, Suppl.XVII, 7-18, Springer-Verlag, 1977.

Sutherland, Richard L., "Handbook of Nonlinear Optics", Preface and Chapter 1, Marcel Dekker, Inc., New York, New York, 1996.

"Quantum Solitons", physicsweb—Physics news, jobs, and resources, available online at: <http://physicsweb.org/article/world/12/2/8/1>, 8 pages, Feb. 1999.

"The Schrodinger Equation", Introduction, pp. 1-3, edited by W. Thirring and P. Urban, Acta Physica Austriaca, Suppl. XVII, Springer-Verlag, 1977.

Delanda, Manuel, "Intensive Science and Virtual Philosophy", Continuum, pp. 132-143, 2002.

Greene, Brian, "The Fabric of the Cosmos—Space, Time, and the Texture of Reality", Vintage Books, pp. 332-335, 368, & 369, 2004.

Kopeika, Norman, S., "A System Engineering Approach to Imaging", SPIE, Bellingham Washington, pp. 71-73, 1998.

Poincare, H., "Science and Hypothesis", Dover Publications, pp. 122-129, 1952.

Hasegawa, Akira, "Optical Solitons in Fibers", Second Enlarged Edition, Springer-Verlag, pp. 14-19, 1990.

PCT/US06/060083 International Search Report dated Jun. 15, 2010.

Office Action dated May 19, 2011 for Chinese patent application No. 200680047785.1.

Tauschwitz, A., et al., "Ion and Laser Induced Plasmas—High Energy Density in Matter", Quantum Plasma Max Planck: (plasma lense focusing device), May 9, 2006, Max-Planck-Institut fur Quantenoptick (MPQ), W-8046 Garching, Germany, Available Online at: <http://www.gsi.de/GSI-Future/cdr/PDF/S2_Kap4.pdf>.

* cited by examiner

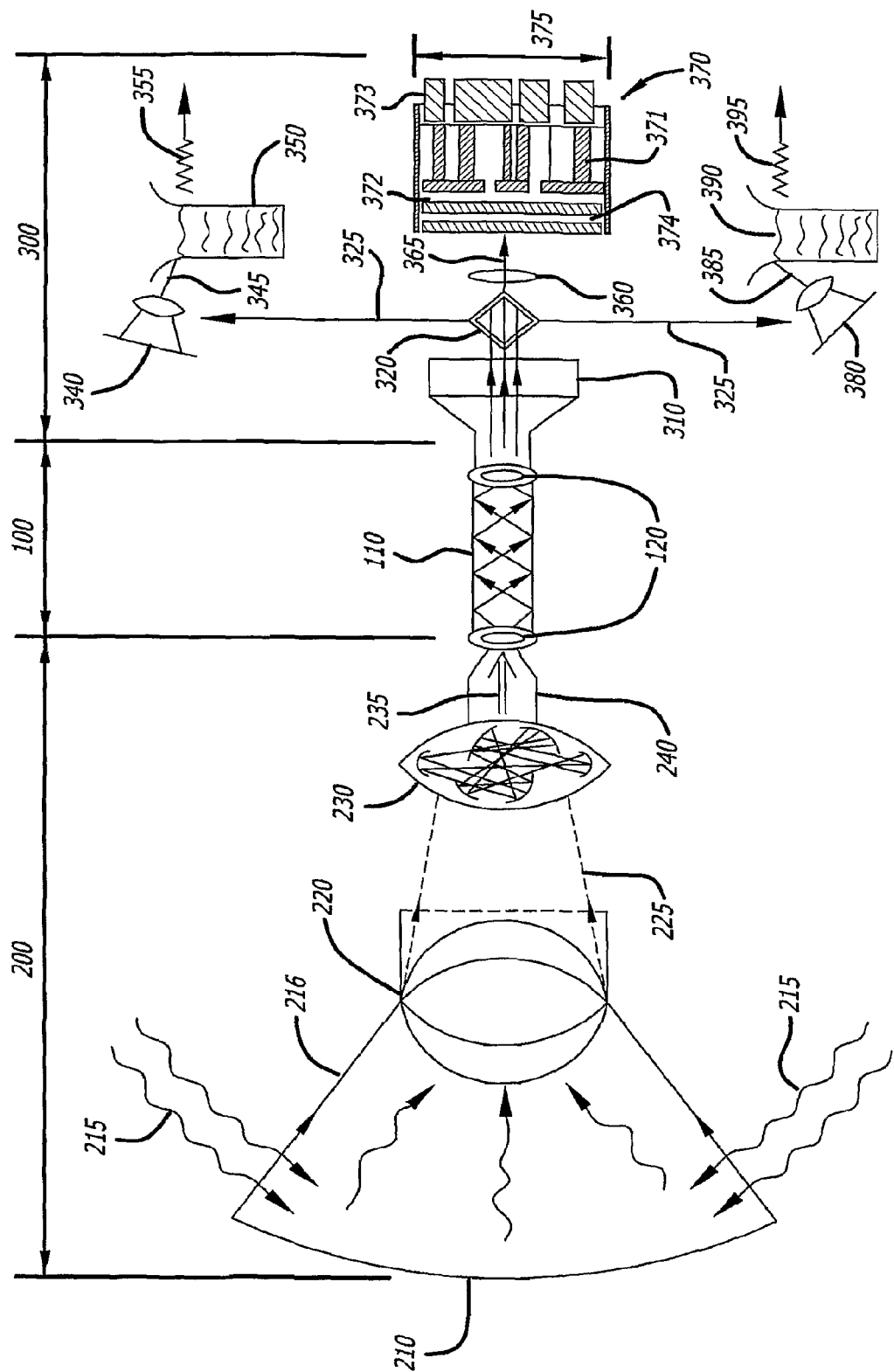

METHOD FOR CONCENTRATING AND TRANSMITTING ENERGY OVER AN OPTICAL CONDUIT

CROSS-REFERENCE TO RELATED APPLICATIONS

This application is claims the benefit of U.S. Provisional Patent Application No. 60/728,245, filed Oct. 19, 2005, which is herein incorporated by reference in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The invention relates to a distributive optical energy system and method. More specifically, the invention relates to a system for transmitting solar and non-solar energy through one or more conduits of heat-resistance optical cables.

BACKGROUND

It has been known since Einstein's break with classical physics that light travels as both a wave and particle, and that energy is directly proportional to a body's inertia and to the speed of light. It has been also known from his special relativity that the energy of any object can be found by combining its inert with its kinetic energy in an equation with just three parameters: mass, the speed of light and the particle speed. However, to support his theory, Einstein required that time is locked into energy's conservation and conversion principles.

Due to the energy crises and environmental problems, finding alternative energy solutions has been recently put back into the scientific and political discourse. However, at technology level, time is still within the reversibility domain, and energy devices are sill dependent on entropy constancy. Solar energy, for example, has been considered as solely localized, exclusively based on linear models of energy conservation and conversion.

In view of the foregoing, it is believed that a need exists for a system for transmitting electromagnetic radiation that overcomes the aforementioned obstacles, limitations, and deficiencies of currently available energy generating and distributing systems.

SUMMARY OF THE INVENTION

A system for transmitting solar and non-solar energy through one or more conduits of heat-resistance optical cables is disclosed. The system comprises a first mirror-lens system for concentrating scattered electromagnetic solar rays into a focal plane to produce focused rays. A mirror system concentrator concentrates the focused rays by an N factor. The system includes a coupler and an optical cable to align the focused rays into one conduit of an optical cable and generate a complex optical wave. A coupling focusing collimator couples the optical cable to three different filters where the complex wave is converted into focused rays and then into heat, light, and electricity. A heat filter filters the heat. A light filter filters the light. An electricity filter filters the electricity.

BRIEF DESCRIPTION OF THE DRAWING

FIG. 1 is an illustration of preferred embodiments of a system for generating and transmitting energy in accordance with the present invention.

DETAILED DESCRIPTION

FIG. 1 shows a generator system 200, its first stage composed by objective lenses 220 placed towards luminous, audible and non-audible emitting objects, which emit radiant energy 215 in the form of electromagnetic signals. These electromagnetic signals 215 travel from the said emitting objects in every direction; when the said signals 215 hit the optical collector 210, the reflected signals 216 travel towards the objective lens system 220 from which refracted rays 225 are projected towards a focal plane. A mirror system concentrator DISC) 230 is placed in axial alignment and at the focal length with the lens system 220. The rays 225 of the lens system 220 (the Zoom lens system) are projected onto the MSC 230, which concentrates the rays n times. In one embodiment, N times preferably vary from tenths to millions. In order terms, by multiplying the rays 225 of the lens system 220 by a factor N, the MSC 230 produces a singular over-concentrated light (SOL) 235. It should be understood, for the purpose of the present description, that the term "light" encompasses all the electromagnetic spectrum, from short waves to cosmic rays. The MSC 230, comprising several mirrors in one embodiment, concentrates rays in order to obtain a maximum absolute intensity, i.e., ray intensity in itself. This maximum of intensity is designated herein as the SOL. The MSC 230 concentrates the incoming rays 225 proportional to the wave/particle concentration area and a pre-defined energy demand. One embodiment comprises 16 mirrors, where the radius of curvatures ranges from 20 mm to 6 mm. This MSC reaches a ten thousand concentration index.

In operation, the resultant concentrated energy 235, i.e., SOL, enters an optical cable 120—which includes one or many heat-resistant optic conduits—through a collimating and coupler system 240. The said collimating system 240 is in axial alignment with the said MSC 230, and the said optical conduits 120 in order to produce parallel rays composing the said SOL 235. Once the SOL 235 enters the conduits 120, the SOL's highly intensified rays reflect in the interior of the optical conduit 120 creating a complex energy wave (CEW) 110. The CEW 110 depends on the diameter and length of the optical conduit 120, on the characteristics of the conduit's surface (such as smoothness and elasticity), on the refractive and reflective indexes of the conduit's core and clad (if applied), on the concentration index of the MSC 230, and on the angle of reflection as the SOL's rays enter the conduit 120. Preferably, the CEW 110 obeys the following equation:

$$Z^2 + C = E,$$

where E is the complex energy, C is a complex number, and Z is a feed-forwarding variable, which includes E, and is proportional to the wave density. The CEW 110 comprises a light folding process, meaning that its highly concentrated light rays carry heat and white light. At the distal end of the conduit 120, heat, white light, and electricity are filtered out.

At the distal end of the optical cable 110, one or many conduits carrying the CEW 110 are optically coupled, collimated and focused with 1) a heat filter; an iodine compound 350; 2) a light filter: an alum compound 390; and 3) an electricity filter: a thermal pile compound 370. In one embodiment, a filter is an apparatus that extracts a property from a process.

The CEW 110, and its dissipative (chaotic) self-organizing wave structure, allows the use of very low optical cable diameters: varying from a few microns to a few centimetres, depending on each configuration, energy potential source or demand. This fact enables remote installation of these generator units. Note that CEW's self-organizing behaviour happens especially due to the nonlinearities created by collision (intra photon and photon-electron). This loss of momentum dissipates as heat and feeds itself back into the CEW 110, serving as the energy kick that keeps the wave chaotic, therefore self-organizing.

A generator unit 200 (FIG. 1) which includes the ray-capturing system 210/220 (mirror-lens collectors and/or acoustic bowls, and an objective lens compound), the MSC 230, and the coupler 240, can be installed in every source of solar or non-solar radiation. The generator system 200 is divided in two categories: 1) solar radiation which implies the use of solar collectors preferably parabolic or circular mirrors (210) for reflection of solar waves and objective lenses (220) for refraction and focusing of direct solar radiation onto the MSC 230; 2) non-solar radiation which implies the use of optical collectors using a combination of mirrors-acoustic bowls (210) and objective lenses (220) in order to reflect and refract audible (long) and non-audible (short) electromagnetic waves, and to focus them onto the MSC (230). Therefore, any source of electromagnetic radiation, such as human voices, animal or insect noises, friction noises (such as automobile tires on ground), industrial non-audible noises from motors, engines, classrooms, auditoriums, musical instruments, orchestral concerts, ocean waves, and direct/indirect solar radiation, is a potential source of radiant energy. A local station (said generator 200) can be installed in any of these or other sources, then, via one single optical cable, transmit energy to the distal local station (consumer 300) for consumer distribution.

In this case, continuous (day and night) generation of energy can be provided. In one embodiment, a local station includes two types of generators presented: one that captures solar or luminous radiation, and another that captures all other sources of electromagnetic radiation. Therefore, at night-time this latter local station makes use of the non-solar generator to generate energy from all sources of electromagnetic radiation.

In one embodiment, an application of a solar radiation generator unit uses earth's solar energy, which reaches a maximum average of 1 KW/m² (one kilowatt per square meter). One local station using one solar radiation generator unit with a density index of $1 \times 10^6$ (one million) would produce $1 \times 10^6$ KW/m² (one million Kilowatt per square meter). A home in the U.S. requires an average of 30 KW/m². This solar generator unit alone feeds $1 \times 10^6$ KW/m²÷30 KW/m²=30,000 homes.

An application of a non-solar radiation generation unit uses any form of non-solar electromagnetic radiation. Following the logic of the solar generator discussed in the previous example, one local non-solar unit has a density index of $1 \times 10^6$ (one million). A human being's voice in talking mode averages $3 \times 10^5$ Watts while a human being's voice in shouting mode averages $3 \times 10^{-2}$ Watts. These voices can be powered through electronic power amplifiers. In this regard, one person talking alone will theoretically generate through the said non-solar generator unit the following wattage: $3 \times 10^{-5}$ Watts×$1 \times 10^6$=30 W. If 1,000 people talk for one hour, they will feed an average home in the U.S. for one hour. Likewise, using the same density index of said generator, one person shouting for an hour would feed one home for one hour: ($3 \times 10^{-2}$ Watts×$1 \times 10^6$=30 000 W.) From these examples, those skilled in the art can recognize possibilities to use energy from non-solar sources that are immense, and many different embodiments can be used. A city produces an unlimited variety of audible, non-audible, and industrial sources of energy that can be potentialized using the non-solar generator. A rural area has many other potential sources of energy, such as insects, animals, streams, rivers, electricity wiring transmitters, and such, and can include any form of electromagnetic radiation.

In one embodiment, the density index is limited by the quality of the optical cable including its material weight, granularity, elasticity, diameter, heat-resistance factor, and by the quality and heat resistance factors of mirrors and lenses. In one embodiment, the higher the density index, the higher the cable's diameter is increased to improve the cable's, mirror's and glasses' heat-resistance factors. However, the cable's diameter has an exponential relation with the density index, a value that can be optimized for different applications. In one embodiment, the main variables that determine the limits of the density index are: the total reflection factor and the heat-resistant factor of the optical cable; the mirror's planar and spherical reflection index; the lenses refraction indexes; the heat-resistance factor of mirrors and glasses; and the integrity of CEW's dissipative and self-organizing behaviour.

In one embodiment, the use of bio and nanotechnology can aid in obtaining higher density indexes while maintaining a small optical cable diameter so that a higher complex energy keeps its dissipative and self-organizing behaviour (CEW) as it continuously propagates until it reaches the optical cable's distal end (the consumer's end).

In one embodiment, the density index is determined depending on each installation. In operation is a system to capture radiation from a 1 W/m² energy/area source, which is one thousandth the amount of the solar average energy on earth. A single optical conduit of an internal diameter of 10 mm is used. Although the concentrator factor can reach any magnitude, limited by the first law of thermodynamics and adjusted according to each installation, the concentrator factor for the MSC 230 is calculated so that the original 1 m² reference area is reduced to the optical conduit surface area which is $\pi \times r^2 = 3.14 \times 5^2 = 78.5$ mm². Therefore, the concentrator factor will be 1 m²÷78.5 mm²≈12,740. The average flux at focal point will be 1 W/m²×12,740=12,740 W/m²; and at the conduit's surface area, which is 78.5 mm², the flux will be 1 W/m². Considering an efficiency of 0.9, the real average flux will be 12,740 W/m²×0.9=11,466 W/m². The MSC design is based on concepts known to the art of solar energy collectors, applied to both parabolic and spherical mirrors as well as to lenses, and varies depending on each application. Conceptually, the mathematics of optical collectors design is basically derived from known heat transfer and optical laws, notably: 1) the three modes of heat transfer, namely conduction, convection and radiation; 2) the laws of reflection and refraction relating the interaction between electromagnetic radiation and matter. To calculate the amount of heat at the entrance of the said optical conduit 120, the Stefan-Boltzmann law of radiation is used: $H = Ae\delta T^4$ [where H=Radiant Energy in watts; A=Surface Area; e=the emissivity; δ=the Boltzmann constant ($5.6699 \times 10^{-8}$ W·m⁻²·K⁻⁴); T=Kelvin Temperature].

In case of a MSC composed of lenses, mirrors, or a combination of both, thermal radiation will be increased and can be calculated using quantum radiation propagation based on two relations: 1) the energy of a photon: E=hv [where v is frequency and h is Planck's constant=$6.625 \times 10^{-34}$ J·s); 2) c=$\lambda$v=co$^a$/n (where c=the speed of tight; $\lambda$=wavelength; v=frequency; co$^a$=the speed of light in a vacuum; n=index of refraction of the medium.] Note that thermal radiation is usually considered to fall within the band from about 0.1 to 100 µm, whereas solar radiation is concentrated in the wavelength range between 0.1 and 3 µm. The use of spherical mirrors is preferable for having less surface contact, therefore emitting less thermal radiation. Applying the above values in the formula and calculating for T, the temperature at focal point will be:

$$T = \sqrt[4]{H/\delta}$$
$$= \sqrt[4]{11,466 \text{ W/m}^2 \div 5.6699 \times 10^{-8} \text{ W} \cdot \text{m}^{-2} \cdot \text{K}^{-4}}$$
$$T \approx 671 \text{ K}$$
$$\approx 398 \text{ C}.$$

This thermo dense light enters the optical conduit at an angle (less than 45 degrees) such that to balance inner reflection with the conduit's heat resistance. It should be noted that, in order to obey the principle of total reflection through the optical conduit, a core and cladding section (similar to fiber optics but with much higher dimensions) could be applied to the optical conduit's physical structure. As soon as radiant electromagnetic rays enter the cold and reflective surface of a 10 mm inner diameter of the optical conduit, persistent particle interactions cause the optical conduit's internal energy to change; an energy which is limited by the system's thermodynamic limit (the ratio of the total number of particles per total volume). Several physical phenomena will happen at once, but most importantly the rise in temperature will alter the molecular structure of the glass and stimulate electrons to change energy levels, therefore generating more photons. The heat from particle stimulation is transformed in work according to Q=cm$\Delta$T [where Q=heat capacity in J/(kg·C.°) which depends on the nature of the material (for glass=840); cm=mass in kg, $\Delta$T=the temperature change.] This work feeds back into the electromagnetic radiation. However, because particle collision will be happening in three or more dimensions and in random motion, each particle will change speed and direction of motion, and the interaction photon-electron could generate photons travelling faster than the speed of light. As a photon is absorbed by an electron, the electron transits to a lower energy level, and a new photon is released. This scattering of light could lead the electron to travel backwards in time in order to absorb a photon. A photon, while being generated by a differentiating electron, can also travel backwards in time, changing particle charge and generating an anti-particle. These particles while travelling backwards in time can also collide. When a particle and an anti-particle collide they annihilate each other: however, depending on the amplitude and frequency more than one photon can be released from the particle-anti-particle collision. This phenomenon, according to quantum electrodynamics, illustrates an increase of light intensity and a release of energy that feeds back into the overall electromagnetic wave. The total energy generated will be proportional to the overall glass area of the optical conduit, the quality of the glass, the density index (as discussed previously), and the heat. The total energy E is the sum of the rest energy Eo and the kinetic energy KE, or E=Eo+KE and is based on Einstein's special relativity given by the relation: E=$mc^2/\sqrt{1-v^2/c^2}$ (m=mass; v=particle speed; c=speed of light). From this relation, if, as mentioned above, a particle travels backwards in time (speed higher than the speed of light) then $v^2/c^2$ will be higher than 1, making $\sqrt{1-v^2/c^2}$=a complex number. This new energy equation can be re-written as E=$mc^2$/iy+C (where i=the imaginary part and C=a complex constant). According to Quantum Electrodynamics, the probability of an event is the absolute square of a complex number. Therefore, the probability of the event "particles travelling higher than the speed of light" becomes high in the case in operation. This is one aspect that contributes to the formation of said CEW 110.

Another aspect is the nonlinearity of the glass's surface, which will be even increased by its molecular thermal stress due to heat. As photons and heat stimulate electrons that stimulate anti-particles and other photons and other anti-particles, they vibrate as waves depended on change in momentum, energy and wavelength given by the De Broglie's relation: $\lambda$=h/p ($\lambda$=particle wavelength; h=Planck's constant; p: the magnitude of the relativistic momentum of the particle). It should be noted that the amplitude for a photon to be emitted by a source varies, in general, with time. As time goes on, the angle of amplitude of a photon to be emitted by a source changes. In the presently described system, the source is white light and its many colors emit photons randomly, making the angle of amplitude change irregularly. Therefore, a photon will change wavelength (therefore color) after being absorbed then generated back as a new photon by an electron. The irregularities of particle wavelength and momentum are other contributions to the creation of CEW.

The second law of thermodynamics states that "heat flows spontaneously from a substance at a higher temperature to a substance at a lower temperature and does not flow spontaneously in the reverse direction." Therefore, the heat wave flow will seek, in acceleration mode, the optical conduit's distal end. This continual electromagnetic heat-flow moves through the optical conduit and generates a special pattern in which millions of molecules move coherently, a situation that maintains a state of non-equilibrium. Together with the non-linearity on the glass' surface and the irregularities of particle wavelength and momentum, with time this non-equilibrium state will turn the CEW into a self-organizing wave. Nobel Laureate Ilya Prigogine named this phenomenon "dissipative structure." According to Prigogine, farther away from equilibrium the fluxes are stronger, entropy production increases, and the system may encounter instabilities leading to new forms of order that move the system farther and farther away from the equilibrium state as these dissipative structures develop into forms of ever-increasing complexity. The high density of particle concentration will allow for the rapidly growth of clusters around more dense areas. These clusters easily move through the expanded (by heat tension) molecules of the glass allowing for the transformation of (inert) energy into active energy as photons stimulate electrons in other regions into the glass' thickness. This process increases the active population growth, i.e., the number of stimulated electrons. The overall energy is given by CEW's relation: $Z^2$+C=E, where E is the complex energy, C a complex number, and Z is a feed-forwarding variable, which includes E, and is proportional to the population density.

Note that external factors, such as gravitation, can be magnified by non equilibrium states which help increase symmetry breaking, contributing to the overall purpose of enhancing active population growth. Furthermore, the optical conduit can be made of organic material so that external factors participate even more dynamically in the increase of population growth (to win particle threshold from inert to active) and the consequent increase of integral energy as well as CEW's travel distance.

A final consideration regarding the building of the MSC 230 relies on the fact that it is common knowledge to anyone familiar in the art of optics applied to solar energy that to capture solar energy both image-forming (IF) and non-imaging forming (NIF) concentrators can be employed. Regarding the IF's, ideal operation can be achieved by the use of spherically symmetric geometry, a dynamically flexible refractive index (for lens-based MSC's), and the use of materials (hybrid organic) with high refractive indexes and close to zero dispersion. Although energy efficiency is much higher in NIF's concentrators, IF's have the advantage of employing materials with much less heat resistance. In compensation IF's concentrator factors are substantially lower than NIF's. All that is said about IF's and NIF's for capturing solar energy is valid for capturing any source of electromagnetic radiation.

The Heat Filter extracts heat, i.e., it filters out heat from the complex energy wave, CEW. Heat travels in concentrated dissipative form within the CEW; there are many ways to extract this concentrated heat from the CEW. One process is by using an Iodine Composition in solid, liquid or gas form. The solid form, for example, is a prism composed by an iodine solution. In this case, as FIG. 1 shows, CEW 110 signals become the non-scattered highly focused rays 345 after passing through the distributor collimator 320 as they are optically captured by the objective mirror-lens system 340. The said rays 345 hit the iodine prism 350 and only heat comes out because iodine blocks off visual light and allows infra-red to come out; and infra-red light, with wavelengths around 800 nanometers, produces the highest amount of radiant energy. In operation, the optical conduit/s carrying the CEW 110 is optically coupled through coupler 310 to the said distributor collimator 320 optically in alignment with a focusing and collimating system 340, comprised of mirrors and prisms, to capture, align and focus the light rays 325 (the regenerated consumer SOL), so that rays 345 are directly focused onto the said iodine solid, liquid or gas solution 350 from which an over-concentrated infra-red light 355 is filtered out. Placing a bucket of water at the focal point of this ray, the bucket is led to boiling instantly. Placing a solid material like coke, it leads immediately to incandescence. Zinc burns up at the same place, while magnesium ribbon bursts into vivid combustion. A sheet of platinized platinum placed at the focus heats to whiteness.

The light filter extracts visible light, i.e., it filters out visible light from the complex energy wave, CEW. Visible light travels in concentrated dissipative form within the CEW; there are many ways to extract this concentrated visible light from the CEW. One process is by using an alum composition in solid, liquid or gas form. The solid form, for example, is a prism composed by an alum solution. In this case, see FIG. 1, when the said rays 325 (the regenerated consumer SOL) from the CEW pass through the objective mirror-lens system 380 and hit the alum solution 390, visible light 395 is filtered out. Therefore, as known in the art since Newton, by placing a prism in axial alignment with the alum compound 390, all the color spectrum of visual light can be seen. In operation, the optical conduit/s carrying the CEW 110, is optically coupled through the coupler 310 to the said distributor collimator 320 in optical alignment with a focusing and collimating system 340, comprised of mirrors and prisms, to capture, align and focus the light rays 325 (the regenerated consumer SOL), so that the rays 385 are directly focused onto the said alum solid, liquid or gas solution 390 from which a highly focused, collimated and over-concentrated visible light 395 is filtered out. All other rays of the luminous spectrum are blocked off. Small reflectors placed along the optical axis of the visible light 395 serve as optical lamps. A conduit of fiber optics can also take the visible light to local destinations of a building, for example, where at distal ends the optical lamps are installed.

The Electricity Filter extracts electricity, i.e., it filters out or transforms into electricity certain components of the complex energy wave, CEW, like vibration, heat, magnetic and electric fields. These components travel in concentrated dissipative form within the CEW; there are many ways to extract and convert these concentrated components from the CEW. For example piezoelectricity is a process that converts mechanical stress into voltage, and vice-versa, through piezo generators and piezo motors, respectively. The process per se is well known in the industry. It can be used in one embodiment by the use of ceramic sheets placed in front of the light rays 325 (the regenerated consumer SOL) as high dense waves vibrate onto the ceramic, creating mechanical stress and enabling the ceramic to produce voltage. Electromagnetism is another known process and can be utilized in the present invention as the said light rays 325 can be passed into magnetic tubes and pipes—inductors coiled around these pipes or tubes generate voltage. One process, see FIG. 1, to convert heat into electricity comprises in using a thermo-electric semiconductor compound 370. This converter 370 is composed of an array of PN silicon junctions 371. Blackened-receiving plates 372 are attached to one side of the said PN junction 371 to absorb maximum of the incoming radiant energy. Fins 373 are attached to the other side of the said junction 371. The converter 370 is enclosed in a box with glass windows 374 on the side facing the rays 365. Glass windows are transparent to most energy radiation from said SOL 325 but opaque to the rays of long wavelength which are emitted by the said heated receivers 372. In operation, the optical conduit/s carrying the CEW 110, is optically coupled through the coupler 310 to the said distributor collimator 320 in optical alignment with a focusing and collimating system 360, comprised of mirrors and prisms, to capture, align and focus the light rays 325 (the regenerated consumer SOL), so that rays 365 are directly focused onto the said glass windows 374 of the thermoelectric converter 370, from which a highly focused, collimated and overconcentrated beam creates a difference of temperature at the receiver plates 372 and a current is generated at the PN junctions 371 and available as an electric potential 375.

What is claimed:

1. A method of capturing and transmitting radiation comprising:
   capturing radiation;
   focusing the captured radiation;
   concentrating the focused radiation;
   collimating the concentrated radiation;
   aligning the collimated radiation with a disorder-enhanced optical conduit;
   directing the radiation into the optical conduit;
   promoting scattering of particles and waves of the radiation in the optical conduit;
   increasing entropy within the optical conduit;
   intensifying at least one of particle, wave and atomic collisions in the optical conduit leading to energy transfer;
   distributing the energy unequally in the optical conduit leading the energy to assemble into a self-organized complex energy wave;
   transmitting the complex energy wave through the optical conduit; and
   extracting light, heat and electricity from the complex energy wave.

2. The method of claim 1 and further including the step of distributing the light, heat and electricity.

3. The method of claim 1 wherein the radiation is solar radiation.

4. The method of claim 1 wherein the radiation is focused by a factor of N, wherein N is in the range of one to one hundred million.

5. A method for collecting energy from radiant and mechanical sources, the method comprising:
- capturing energy from at least one of radiant and mechanical sources;
- concentrating the energy;
- combining the concentrated energy to produce radiation;
- directing the radiation to a disorder-enhanced structure;
- stimulating scattering of the radiation in the structure;
- increasing entropy in the structure;
- intensifying particle collisions within the structure;
- spreading the energy distribution within the structure;
- generating a complex energy wave; and
- filtering the complex energy wave.

6. The method of claim 5, wherein capturing energy includes collecting radiant rays indicative of solar radiation with a parabolic mirror.

7. The method of claim 5, wherein capturing energy comprises collecting energy indicative of acoustic radiation with an acoustic bowl.

8. The method of claim 7, further comprising focusing through reflection and refraction lenses the captured energy.

9. The method of claim 5, wherein concentrating the energy comprises concentrating the energy with an image forming concentrator.

10. The method of claim 5, wherein concentrating the energy comprises concentrating the energy with a non-image forming concentrator.

11. The method of claim 5, wherein filtering the complex energy wave comprises heat filtering and converting the complex energy wave to extract heat.

12. The method of claim 5, wherein filtering the complex energy wave comprises light filtering and converting the complex energy wave to extract visible light.

13. The method of claim 5, wherein filtering the complex energy wave comprises electricity filtering and converting the complex energy wave to extract electricity.

14. The method of claim 5, and further including the step of generating heat.

15. The method of claim 5, and further including the step of generating light.

16. The method of claim 5, and further including the step of generating electricity.

* * * * *

UNITED STATES PATENT AND TRADEMARK OFFICE
CERTIFICATE OF CORRECTION

PATENT NO.        : 8,426,790 B2
APPLICATION NO.   : 12/090721
DATED             : April 23, 2013
INVENTOR(S)       : Aluizio M. Cruz Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1285 days.

Signed and Sealed this
Eighth Day of September, 2015

Michelle K. Lee
*Director of the United States Patent and Trademark Office*